(12) United States Patent
Sasaki et al.

(10) Patent No.: US 9,771,086 B2
(45) Date of Patent: Sep. 26, 2017

(54) AIR-CONDITIONING DUCT IN PASSENGER CAR AND RAILCAR

(71) Applicant: KAWASAKI JUKOGYO KABUSHIKI KAISHA, Kobe-shi, Hyogo (JP)

(72) Inventors: Takashi Sasaki, Kobe (JP); Yoshinori Hara, Kobe (JP); Yasuo Onitake, Akashi (JP); Ryosuke Mitani, Akashi (JP); Kouki Kondo, Kobe (JP); Keiji Sakagawa, Akashi (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 464 days.

(21) Appl. No.: 14/369,907

(22) PCT Filed: Nov. 7, 2012

(86) PCT No.: PCT/JP2012/078857
§ 371 (c)(1),
(2) Date: Jun. 30, 2014

(87) PCT Pub. No.: WO2013/111417
PCT Pub. Date: Aug. 1, 2013

(65) Prior Publication Data
US 2014/0370796 A1    Dec. 18, 2014

(30) Foreign Application Priority Data

Jan. 25, 2012 (JP) .................................. 2012-013066

(51) Int. Cl.
*B61D 27/00*     (2006.01)
*F24F 13/02*     (2006.01)
(Continued)

(52) U.S. Cl.
CPC ....... *B61D 27/009* (2013.01); *B60H 1/00371* (2013.01); *B60H 1/00564* (2013.01);
(Continued)

(58) Field of Classification Search
CPC .................. B60H 1/00371; B60H 1/00; B60H 2001/00235; B60H 1/00564; B61D 27/00;
(Continued)

(56) References Cited

U.S. PATENT DOCUMENTS 2,673,512 A * 3/1954 Henney .............. B60H 1/00371
454/105
2,698,569 A * 1/1955 Reynolds ........... B60H 1/00371
105/340
(Continued)

FOREIGN PATENT DOCUMENTS

DE       2909628 A1 *  9/1980   ......... B60H 1/00371
JP    U1-52-159508      12/1977
(Continued)

OTHER PUBLICATIONS

Nov. 9, 2015 Extended Search Report issued in European Patent Application No. 12866750.8.
(Continued)

*Primary Examiner* — Steven B. McAllister
*Assistant Examiner* — Steven Anderson, II
(74) *Attorney, Agent, or Firm* — Oliff PLC

(57) ABSTRACT

An air-conditioning duct in a passenger car of transportation which is extended in a vehicle length direction in a ceiling portion of the passenger car utilized by the general public and receives conditioned air from an air-conditioning apparatus regulating a temperature of the air to guide the conditioned air into an inside of the passenger car. The air-conditioning duct in a passenger car has a non-uniform distribution configuration which makes the discharge vol- (Continued)

ume of the conditioned air from the air-conditioning duct into the inside of the passenger car different and non-uniform among the respective regions of the inside of the passenger car.

25 Claims, 13 Drawing Sheets

(51) Int. Cl.
  *B60H 1/00* (2006.01)
  *B61D 17/12* (2006.01)
  *F24F 7/04* (2006.01)

(52) U.S. Cl.
  CPC .............. *B61D 17/12* (2013.01); *B61D 27/00* (2013.01); *B61D 27/0072* (2013.01); *F24F 7/04* (2013.01); *F24F 13/02* (2013.01); *B60H 2001/00235* (2013.01)

(58) Field of Classification Search
  CPC .............. B61D 27/009; B61D 27/0036; B61D 27/0018; B61D 27/0072; B61D 17/12; F24F 7/04; F24F 7/10; F24F 13/02
  See application file for complete search history.

(56) References Cited

U.S. PATENT DOCUMENTS

| | | | |
|---|---|---|---|
| 4,888,959 A | | 12/1989 | Brown |
| 5,707,028 A | * | 1/1998 | Roeper ................... H02G 3/14 244/118.5 |
| 6,491,578 B2 | * | 12/2002 | Yoshinori .......... B60H 1/00007 165/203 |
| 2010/0242513 A1 | | 9/2010 | Nishino et al. |
| 2011/0187157 A1 | | 8/2011 | Yamazaki et al. |
| 2011/0216503 A1 | * | 9/2011 | Ramodien .......... H05K 7/20736 361/691 |
| 2012/0129443 A1 | * | 5/2012 | Bastow ................... F24F 13/16 454/258 |

FOREIGN PATENT DOCUMENTS

| | | | |
|---|---|---|---|
| JP | U1-54-169305 | | 11/1979 |
| JP | 5579952 | * | 6/1980 |
| JP | A-55-079952 | | 6/1980 |
| JP | U1-55-131864 | | 9/1980 |
| JP | U-58-75009 | | 5/1983 |
| JP | 59128405 | * | 8/1984 |
| JP | U-59-128405 | | 8/1984 |
| JP | 6045211 | * | 3/1985 |
| JP | A-60-045419 | | 3/1985 |
| JP | U-60-45211 | | 3/1985 |
| JP | A-62-137216 | | 6/1987 |
| JP | 2002337540 A | * | 11/2002 |
| JP | A-2009-006865 | | 1/2009 |
| JP | A-2009-113656 | | 5/2009 |
| JP | A-2010-221921 | | 10/2010 |
| JP | A-2011-162085 | | 8/2011 |
| JP | A-2012-006529 | | 1/2012 |

OTHER PUBLICATIONS

Jan. 8, 2013 International Search Report issued in International Application No. PCT/JP2012/078857.

* cited by examiner

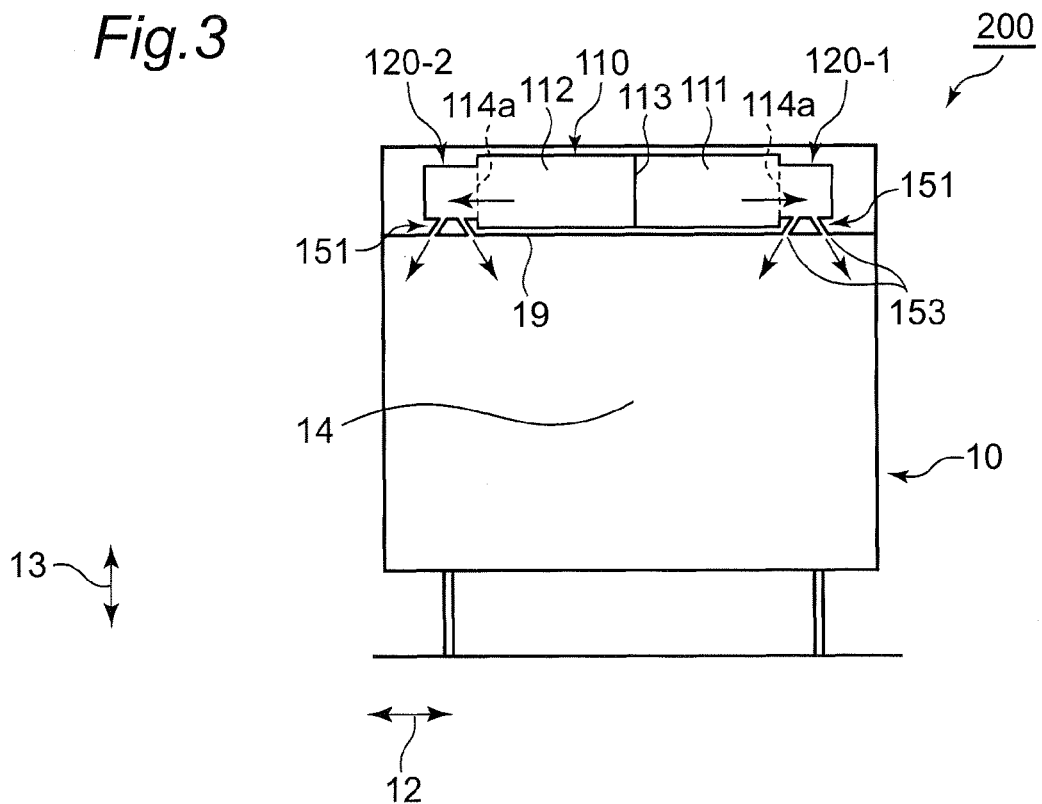
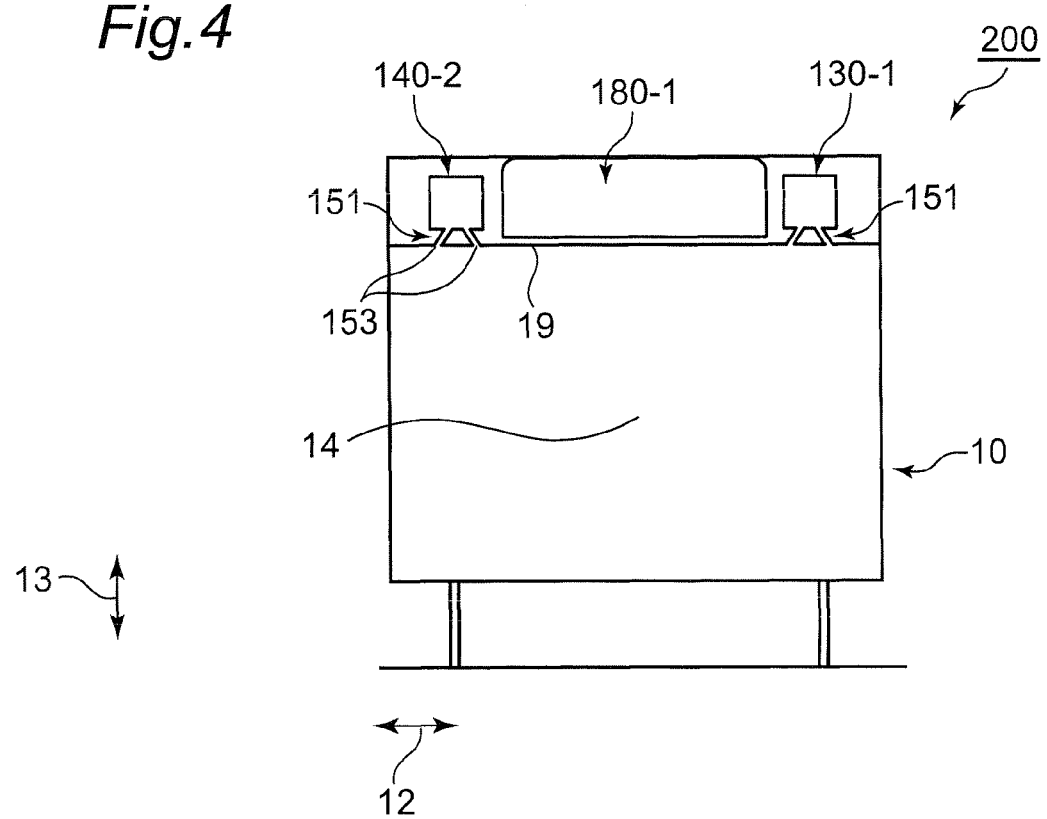

AIR-CONDITIONING DUCT IN PASSENGER CAR AND RAILCAR

TECHNICAL FIELD

The present invention relates to an air-conditioning duct in a passenger car of a large-sized transportation, such as a railcar, an aircraft, a ship, and a bus, and a railcar including the same.

BACKGROUND ART

In a passenger car, e.g., a railcar utilized by the general public, an air-conditioning duct is provided at the ceiling portion of the railcar in a longitudinal direction of the railcar, that is, in a vehicle length direction. Conditioned air which is temperature-regulated by an air-conditioning apparatus is discharged into the air-conditioning duct, and is then discharged into an inside of the railcar from the air-conditioning duct in order to regulate the temperature in the inside of the railcar which is an interior.

Of course, the temperature distribution in the interior is preferably uniform throughout the interior in the vehicle length direction. Therefore, as disclosed in e.g., Patent Document 1, conventionally, the temperature-regulated conditioned air is discharged from the air-conditioning duct at a uniform airflow volume throughout the inside of the railcar. The temperature distribution in the inside of the railcar can thus be uniform.

PRIOR ART DOCUMENTS

Patent Documents

Patent Document 1: Japanese Patent Application Laid-Open (JP-A) No. 2009.6865

SUMMARY OF THE INVENTION

Problems to be Solved by the Invention

However, for instance, since the air-conditioning duct is required to be arranged in the limited space at the floor, wall, and ceiling of the railcar, its shape is limited. Therefore, even when, as proposed in Patent Document 1, the cross-sectional area of the air-conditioning duct is changed along the vehicle length direction, it is difficult to discharge the conditioned air at a uniform airflow volume over the vehicle length direction.

In addition, in order to discharge the conditioned air at a uniform airflow volume, there may be a way that the discharge outlet having a higher discharge volume than other portions is closed. However, such airflow volume adjustment by closing the discharge outlet causes the following problems.

That is, the adjustment of the closing amount at the discharge outlet and checking of the airflow distribution are repeated, so that the workability is less to increase the manufacturer's cost. In addition, the closing of the discharge outlet increases the discharge velocity of the conditioned air in other outlets, so that aerodynamic noise due to this is caused or increased. Further, the higher discharge velocity increases the pressure loss, so that the evaporator fan which is included in the air-conditioning apparatus and delivers the conditioned air is required to have a higher blow performance. Thereby, a chain reaction of the cost increase and the fan noise increase due to the high-performance fan selection is also caused.

On the other hand, even when the airflow volume distribution of the air-conditioning duct is appropriately adjusted, when the airflow distribution by diffusers disposed at the discharge outlet of the air-conditioning duct is poor, the mixing of the conditioned air with the air in the interior becomes insufficient. Thus, the temperature distribution in the interior cannot be uniform. In this way, to make the temperature distribution in the interior uniform, the airflow distribution by the diffusers is also required to be adjusted.

The present invention has been made to solve the above problems, and an object of the present invention is to provide an air-conditioning duct in a passenger car and a railcar, which can make the temperature distribution in an inside of the passenger car uniform by a configuration different from conventional ones.

Means for Solving the Problems

To achieve the above object, the present invention is configured as follows.

That is, an air-conditioning duct in a passenger car of transportation of a first aspect of the present invention is configured to extend in a passenger car longitudinal direction at a ceiling portion of the passenger car and supply conditioned air discharged from an air conditioning apparatus into an inside of the passenger car, the air-conditioning duct comprising:

a main duct configured to receive the conditioned air from the air-conditioning apparatus and to be positioned in a substantially center portion in a passenger car width direction;

a chamber duct configured to discharge the conditioned air into the inside of the passenger car and to be positioned to be adjacent to the main duct in the passenger car width direction; and a branch duct configured to discharge the conditioned air into the inside of the passenger car and to be positioned at a passenger car end with respect to the chamber duct in the passenger car longitudinal direction, a discharge volume of the conditioned air discharged from the chamber duct into the inside of the passenger car being higher than a discharge volume of the conditioned air discharged from the branch duct into the inside of the passenger car.

In this way, the air-conditioning duct of the first aspect of the present invention includes a non-uniform distribution configuration which does not equally discharge and which disproportionally discharge the conditioned air into the respective regions inside the passenger car, thereby making the discharge volume of the conditioned air different among the respective regions inside the passenger car. Therefore, the temperature distribution inside the passenger car can be uniform. In addition, this configuration can prevent the cost, noise, and pressure loss from being increased.

In addition, a railcar of a second aspect of the present invention includes the air-conditioning duct in a passenger car of transportation according to the first aspect, and the air-conditioning apparatus arranged on a roof of a railcar and configured to supply conditioned air into the air-conditioning duct.

Effects of the Invention

According to the present invention, the air-conditioning duct in the passenger car and the railcar are provided which can make the temperature distribution in the inside of the passenger car uniform by the configuration different from conventional ones.

BRIEF DESCRIPTION OF THE DRAWINGS

FIG. 3 is a cross-sectional view taken along line A-A shown in FIG. 1;

FIG. 4 is a cross-sectional view taken along line B-B shown in FIG. 1;

EMBODIMENTS OF THE INVENTION

Figure 1:
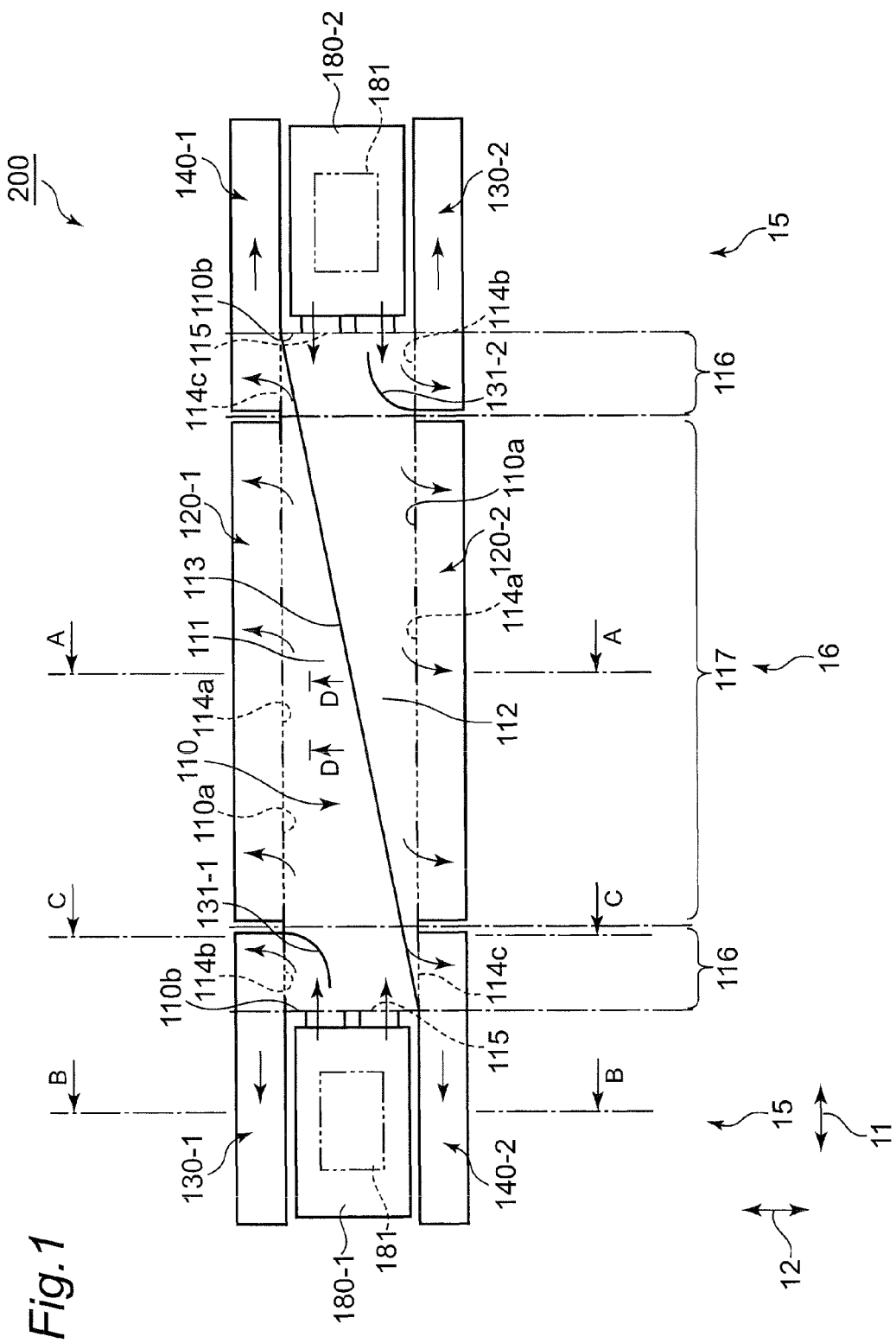
FIG. 1 is a plan view showing the schematic configuration of an air-conditioning duct in a passenger car according to an embodiment.

First Embodiment:

[The Overview of the Configuration of a Railcar Including an Air-conditioning Duct in a Passenger Car of Transportation]

In an air-conditioning duct in a passenger car of transportation and a passenger car air-conditioning system including the air-conditioning duct in the passenger car according to an embodiment, in particular, a railcar will be described below with reference to the drawings. The same or similar configuring portions in the respective drawings are indicated by the same reference numerals.

In the following description, the air-conditioning duct in the passenger car and the passenger car air-conditioning system according to the embodiment are provided in the railcar as an example. However, the air-conditioning duct and system are not limited to the railcar, and are applicable to a large-sized passenger car of transportation, such as an aircraft, a ship, and a bus, which is utilized by the general public.

Figure 2:
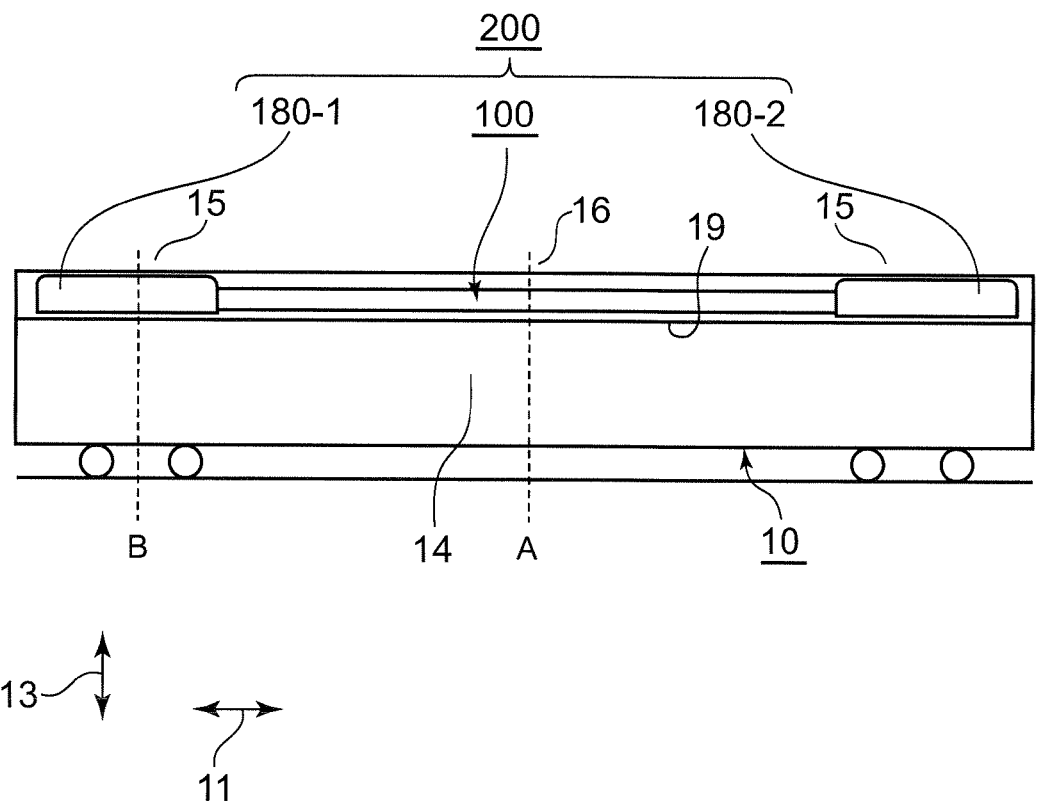
FIG. 2 is a diagram showing a configuration that the air-conditioning duct in the passenger car shown in FIG. 1 is applied to a railcar.

FIG. 1 shows the schematic configuration of the passenger car air-conditioning system, that is, a vehicle air-conditioning system 200 according to the embodiment. The vehicle air-conditioning system 200 basically includes a vehicle air-conditioning duct 100, and an air-conditioning apparatus 180. As shown in FIG. 2, in this embodiment, the vehicle air-conditioning system 200 is installed in the ceiling of a railcar 10, more specifically, on the back side of a ceiling 19 of an interior.

The air-conditioning apparatus 180 regulates the temperature in the interior 14, that is, an inside of the railcar. The air-conditioning apparatus 180 takes in air in the interior 14 from a suction outlet 181, and regulates the air in the inside of the railcar to a preset temperature to discharge conditioned air from discharge outlets into the vehicle air-conditioning duct 100. As shown in FIG. 2, in this embodiment, the air-conditioning apparatuses 180 are installed one by one at vehicle ends 15 on the front and rear sides of one vehicle in a vehicle length direction 11 which is the longitudinal direction of the railcar 10. The installation number of the air-conditioning apparatus 180 is not limited to this. One or more air-conditioning apparatuses 180 can be installed.

The vehicle air-conditioning duct 100 is extended in the vehicle length direction 11 on the back side of the ceiling 19, and is a duct for guiding the conditioned air discharged from the air-conditioning apparatuses 180 into the interior 14. The vehicle air-conditioning duct 100 has a non-uniform distribution configuration which makes the discharge volume of the conditioned air into the interior different and non-uniform at respective regions in the interior.

As described above, conventionally, the discharge volume of the conditioned air from the air-conditioning duct of the prior art has been set a uniform airflow volume over the vehicle length direction, and this has tried to make the temperature distribution in the inside of the railcar uniform. On the contrary, in this embodiment, by change our way of thinking, the vehicle air-conditioning duct 100 has the non-uniform distribution configuration to intentionally make the discharge volume of the conditioned air into the interior 14 different among the respective regions in the interior. Thus, the temperature distribution in the interior can be accomplished to be uniform. Hereinafter, the non-uniform distribution configuration will be described by giving various embodiments.

[The Configuration of the Vehicle Air-conditioning Duct]

In the first embodiment, the non-uniform distribution configuration is formed by the entire vehicle air-conditioning duct 100 and has a configuration in which the conditioned air is discharged from the duct 100 with a higher discharge volume to a center portion 16 in the vehicle length direction 11 than to the vehicle ends 15. Here, the center portion 16 corresponds to a middle part which is about two-fourth when the length of the interior 14 in the vehicle length direction 11 is divided into four equal sections.

The vehicle air-conditioning duct 100 will be described below in more detail.

As shown in FIG. 1, the vehicle air-conditioning duct 100 roughly has one main duct 110, two chamber ducts 120 (a first chamber duct 120-1 and a second chamber duct 120-2), two front branch ducts 130 (a first front branch duct 130-1 and a second front branch duct 130-2), and two rear branch ducts 140 (a first rear branch duct 140-1 and a second rear branch duct 140-2).

[The Configuration of the Main Duct]

The main duct 110 has a width which is e.g., about three-fifth the vehicle width, at a middle part in a vehicle width direction 12 of the vehicle 10. The main duct 110 is located the center portion 16 in the vehicle length direction 11 to be extended at a length which is e.g., about three-fifth the vehicle length in the vehicle length direction 11. Further, the main duct 110 has a partitioning plate 113 which divides the main duct 110 into a first chamber 111 and a second chamber 112, and is a duct of which the conditioned air from the air-conditioning apparatuses 180 disposed at the vehicle ends 15 is discharged into the first chamber 111 and the second chamber 112.

Figure 19:
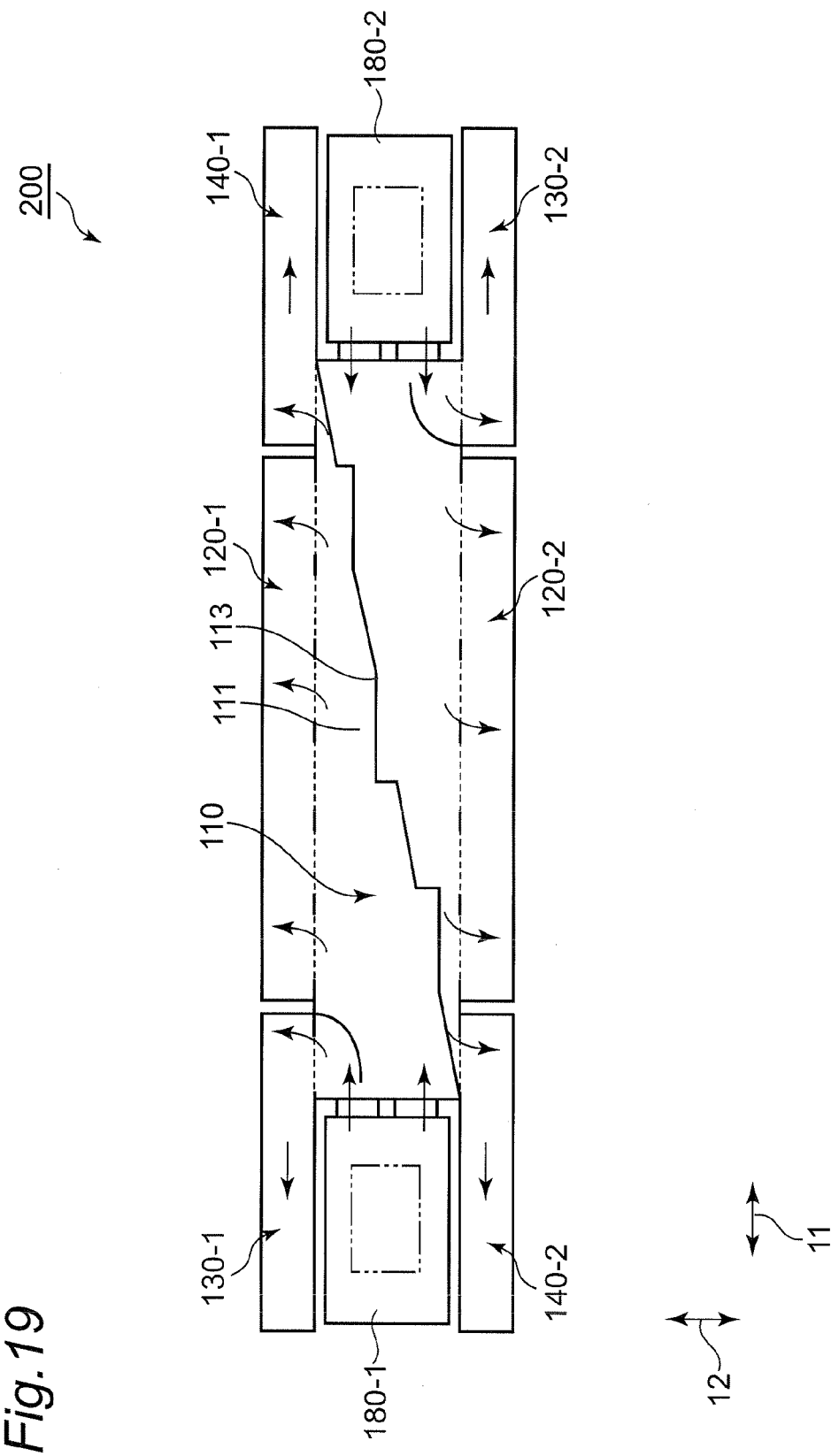
FIG. 19 is a diagram showing a modification example of the air-conditioning duct in the passenger car shown in FIG. 1.

The partitioning plate 113 connects a set of diagonal positions at both ends of the main duct 110 in the vehicle length direction 11 to be extended in the duct. As shown, in this embodiment, the partitioning plate 113 is extended in a linear shape. However, the partitioning plate 113 may be extended in any shape as long as it connects the set of diagonal positions at both ends of the duct, and, as shown in FIG. 19, may be extended in e.g., a step shape.

Figure 5:
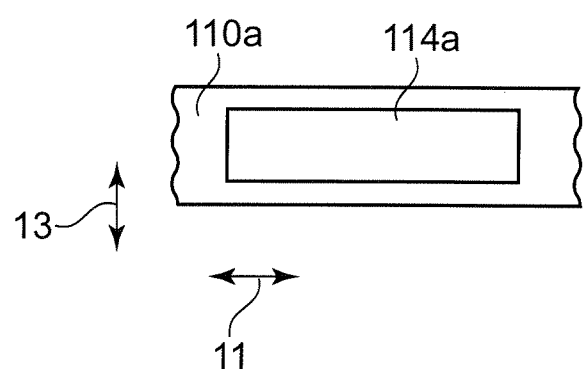
FIG. 5 is a diagram viewed in the direction of arrows D shown in FIG. 1.

In addition, as shown in FIGS. 1 and 5, a plurality of outlets 114a are formed at appropriate intervals in the vehicle length direction 11 in each of side surfaces 110a in the vehicle length direction 11 of the main duct 110 or in each of partition walls between the main duct 110 and the chamber ducts 120. The outlets 114a communicate the main duct 110 with each of the chamber ducts 120.

Further, in this embodiment, two discharge outlets 115 (FIG. 6) are formed in the vehicle width direction 12 in each of end surfaces 110b on the front and rear sides in the vehicle length direction 11 of the main duct 110. The discharge outlets 115 are connected to each of the air-conditioning apparatuses 180. Thereby, the conditioned air generated by each of the air-conditioning apparatuses 180 is discharged through the discharge outlets 115 into the main duct 110, more specifically, into the first chamber 111 and the second chamber 112. Therefore, the conditioned air discharged from the discharge outlets 115 into the main duct 110 can flow into each of the chamber ducts 120 through the outlets 114a.

[The Configuration of the Chamber Ducts]

As shown in FIGS. 1 and 3, the chamber ducts 120 arrange the first chamber duct 120-1 and the second chamber duct 120-2 on the right and left sides of the main duct 110 in the vehicle width direction 12. As described above, each of the chamber ducts 120 communicates with the main duct 110 through the outlets 114a. Each of the chamber ducts 120 thus discharges the conditioned air supplied from the main duct 110 into the interior 14 at the center portion 16 in the vehicle length direction 11. In other words, each of the chamber ducts 120 has a function for stagnating the conditioned air in the main duct 110 which flows strongly in the vehicle length direction 11 once to supply it into the interior 14. The chamber ducts 120, that is, the first chamber duct 120-1 and the second chamber duct 120-2, are extended along the main duct 110 in a main region 117 where end regions 116 of the main duct 110 are eliminated in the vehicle length direction 11. In addition, each of the chamber ducts 120 has a width which is e.g., about one-fourth the width of the main duct 110 in the vehicle width direction 12.

In addition, as shown in FIG. 3, each of the chamber ducts 120 has a diffuser 151 in a lower portion thereof in a vehicle height direction 13. The diffuser 151 is provided in the ceiling 19 of the interior, and discharges the conditioned air supplied from the main duct 110 into each of the chamber ducts 120, into the interior 14. The diffuser 151 has discharge outlets 153.

[The Configuration of the Front Branch Ducts]

The front branch ducts 130 are extended in the same line as the chamber ducts 120 in the vehicle length direction 11, and are arranged in the diagonal positions at the front and rear vehicle ends 15. The front branch ducts 130 discharge the conditioned air into the interior 14 at the vehicle ends 15. In more detail, as described above, the conditioned air is discharged into the first chamber 111 and the second chamber 112 of the main duct 110 in the direction from the vehicle ends 15 to the center portion 16 by the air-conditioning apparatuses 180. Thus, one of the front branch ducts 130, that is, the first front branch duct 130-1, is arranged on the upstream side of the conditioned air flowing within the first chamber 111, and the other front branch duct 130, that is, the second front branch duct 130-2, is arranged on the upstream side of the conditioned air flowing within the second chamber 112. In this embodiment, the first front branch duct 130-1 is arranged to be adjacent to the first chamber duct 120-1, and the second front branch duct 130-2 is arranged to be adjacent to the second chamber duct 120-2. In addition, as shown in FIG. 1, in this example, one front outlet 114b for each of the front branch ducts 130 is formed in each of the side surfaces 110a in each of the end regions 116 of the main duct 110 or in each of partition walls between the main duct 110 and each of the front branch ducts 130. Each of the front outlets 114b communicates the main duct 110 with each of the front branch ducts 130. Therefore, the front branch ducts 130 communicate with the first chamber 111 and the second chamber 112 to discharge the conditioned air into the interior 14 at the vehicle ends 15. Like each of the chamber ducts 120, the diffuser 151 is provided in the lower portion of each of the front branch ducts 130.

In FIG. 1, each of the chamber ducts 120 and each of the front branch ducts 130 are arranged in the same line so that their center lines in the vehicle width direction 12 coincide with each other. However, each of the chamber ducts 120 and each of the front branch ducts 130 may be arranged so that their center lines are shifted from each other, and may be shifted from each other in the vehicle width direction 12.

[The Configuration of the Front Guide Plates]

Further, the front branch ducts 130 have front guide plates 131 (a first front guide plate 131-1 and a second front guide plate 131-2). The front guide plates 131 intake the conditioned air which is discharged from the air-conditioning apparatuses 180 into the main duct 110, more specifically, into the first chamber 111 and the second chamber 112, into the front branch ducts 130 through the front outlets 114b. In this embodiment, the first front guide plate 131-1 intakes the conditioned air which is discharged into the first chamber 111, into the first front branch duct 130-1 through the front outlet 114b, and the second front guide plate 131-2 intakes the conditioned air which is discharged into the second chamber 112, into the second front branch duct 130-2 through the front outlet 114b.

Figure 6:
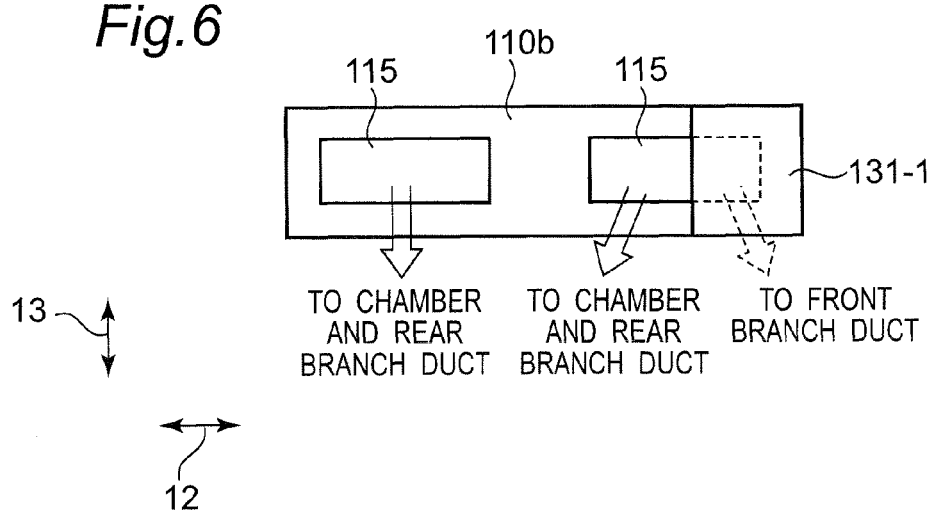
FIG. 6 is a diagram viewed in the direction of arrows C shown in FIG. 1.
Figure 7:
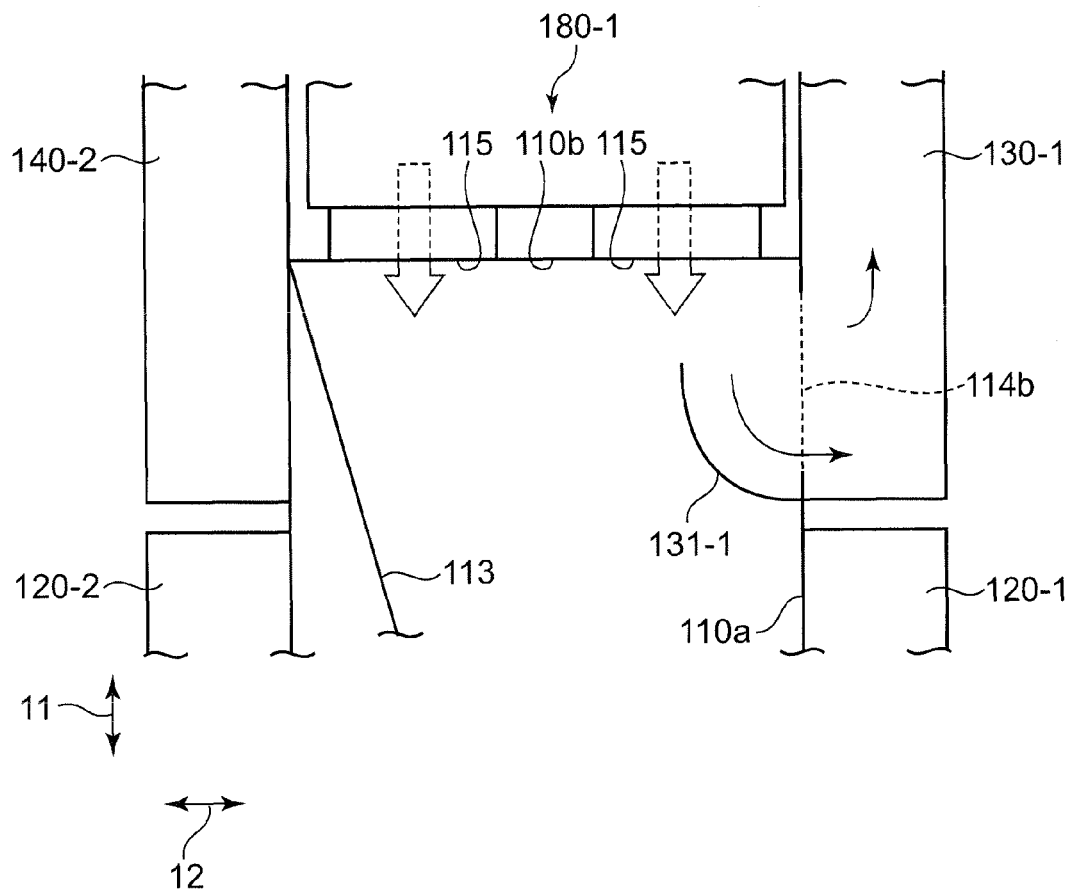
FIG. 7 is an enlarged plan view of a vehicle end of the air-conditioning duct shown in FIG. 1, showing a front guide plate.

As shown in FIGS. 1, 6, and 7, each of the front guide plates 131 has a height which coincides with the height of the main duct 110 in the vehicle height direction 13, is provided to stand on each of the side surfaces 110a of the main duct 110, and projects from each of the front branch ducts 130 into the main duct 110. Therefore, as shown in FIG. 6, each of the front guide plates 131 is disposed to be spaced in the vehicle length direction 11 with respect to one of the two discharge outlets 115 which discharge the conditioned air from each of the air-conditioning apparatuses 180, and is placed over the above one discharge outlet 115 at the following percentage. The area of the discharge outlet 115 is covered at a cover percentage of 35% to 60% in the vehicle width direction 12.

Each of the front branch ducts 130 which has each of the front guide plates 131 can efficiently intake thereinto the conditioned air discharged from each of the air-conditioning apparatuses 180.

Figure 8:
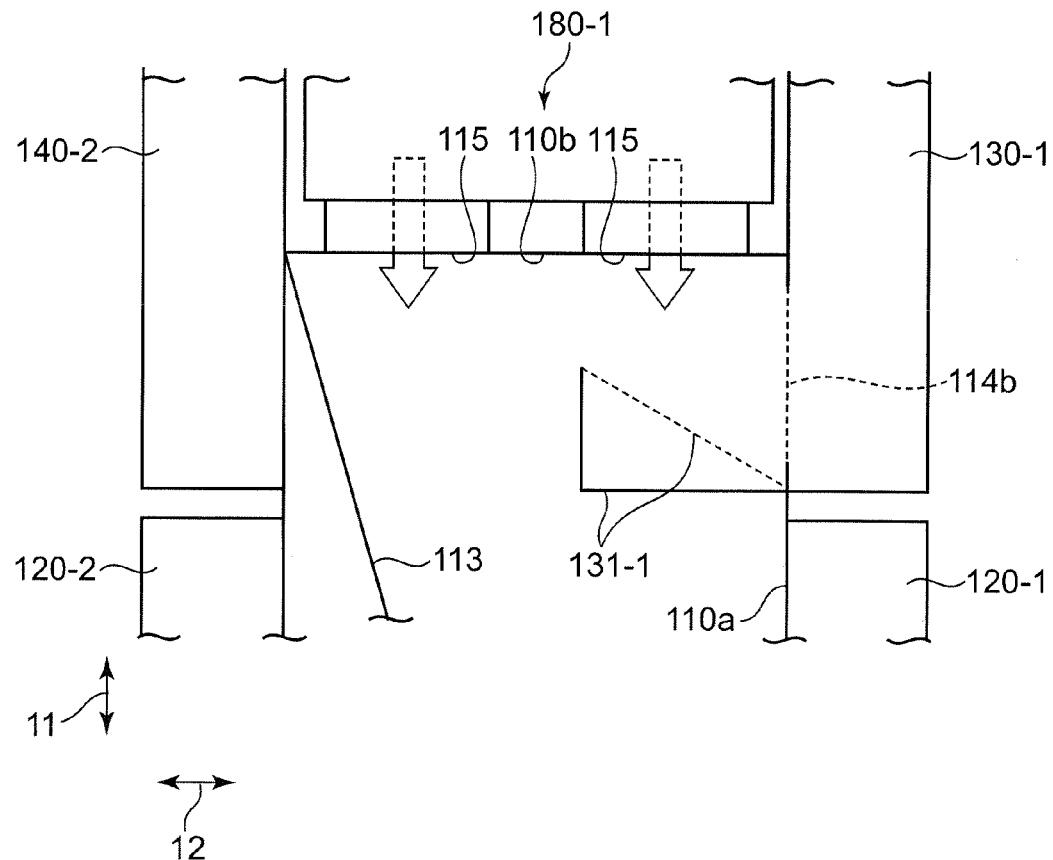
FIG. 8 is a plan view showing a modification example of the front guide plate shown in FIG. 7.

As shown in FIG. 7, in this embodiment, each of the front guide plates 131 has an arc shape, but its shape is not limited to this. As shown in FIG. 8, each of the front guide plates 131 may have e.g., an L-shape indicated by the solid line or a linear shape indicated by the dotted line. In brief, each of the front guide plates 131 may have any shape which can efficiently intake the conditioned air discharged from the discharge outlets 115 into each of the front branch ducts 130 through each of the front outlets 114b.

Figure 9:
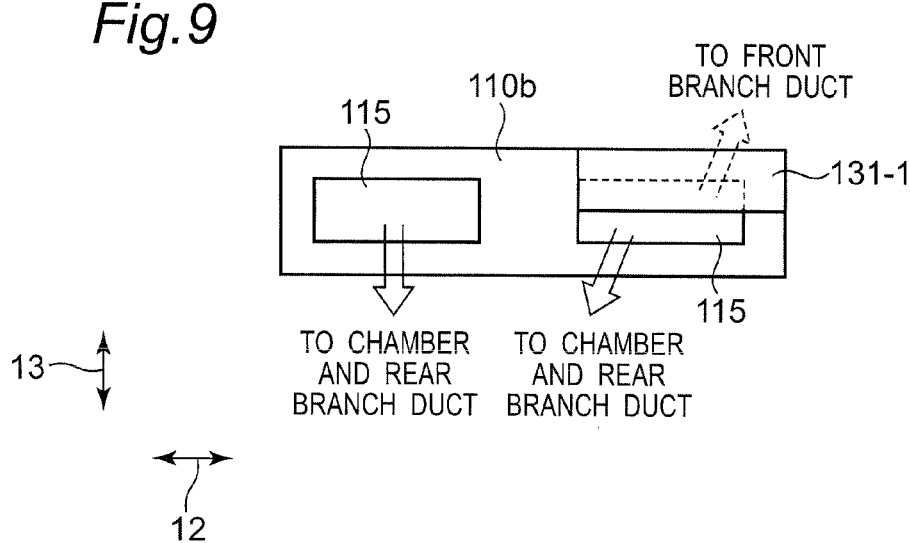
FIG. 9 is a front view showing a modification example of the front guide plate shown in FIG. 7.

In addition, the height dimension of each of the front guide plates 131 in the vehicle height direction 13 is not required to coincide with the height of the main duct 110. That is, as shown in FIG. 9, under the condition that the cover percentage with respect to one of the discharge outlets 115 described above is satisfied, each of the front guide plates 131 can be placed to cover the entire discharge outlet 115 in the vehicle width direction 12, and to have a predetermined height from the upper surface of the main duct 110 to the lower surface thereof in the vehicle height direction 13. Here, the predetermined height is a height which covers the area of one of the discharge outlets 115 at a cover percentage of 35% to 60% in the vehicle height direction 13. Of course, opposite from FIG. 9, the front guide plates 131 may have the predetermined height from the lower surface of the main duct 110 to the upper surface thereof in the vehicle height direction 13.

[The Configuration of the Rear Branch Ducts]

Like the front branch ducts 130 described above, the respective rear branch ducts 140 are extended in the same line as the respective chamber ducts 120 in the vehicle length direction 11, and are arranged in the diagonal positions at the front and rear vehicle ends 15. The rear branch ducts 140 discharge the conditioned air into the interior 14 at the vehicle ends 15. However, the arrangement of the rear branch ducts 140 with respect to the conditioned air is different from the arrangement of the front branch ducts 130 with respect to the conditioned air. That is, the first rear branch duct 140-1 corresponding to one of the rear branch ducts 140 is arranged on the downstream side of the conditioned air flowing in the first chamber 111, not on the upstream side thereof, and the second rear branch duct 140-2 corresponding to the other rear branch duct 140 is also arranged on the downstream side of the conditioned air flowing in the second chamber 112.

In FIG. 1, each of the chamber ducts 120 and each of the rear branch ducts 140 are arranged in the same line so that their center lines in the vehicle width direction 12 coincide with each other. However, each of the chamber ducts 120 and each of the rear branch ducts 140 may be arranged so that their center lines are shifted from each other, and may be shifted from each other in the vehicle width direction 12.

[The Configuration of the Diffusers]

As shown in FIG. 1, in this example, one rear outlet 114c for each of the rear branch ducts 140 is formed in each of the side surfaces 110a in each of the end regions 116 of the main duct 110 or in each of partition walls between the main duct 110 and the rear branch ducts 140. Each of the rear outlets 114c communicates the main duct 110 with each of the rear branch ducts 140. Therefore, the rear branch ducts 140 communicate with the first chamber 111 and the second chamber 112 to discharge the conditioned air into the interior 14 at the vehicle ends 15. In addition, like each of the chamber ducts 120 and each of the front branch ducts 130, the diffuser 151 is provided in the lower portion of each of the rear branch ducts 140.

In this way, as shown in FIG. 4, each of the front branch ducts 130 described above and each of the rear branch ducts 140 described now are arranged at each of the front and rear vehicle ends 15 in the vehicle length direction 11 to sandwich each of the air-conditioning apparatuses 180 therebetween from both sides in the vehicle width direction 12. In this embodiment, as shown in FIG. 1, the first front branch duct 130-1 and the second rear branch duct 140-2 are arranged at one of the vehicle ends 15 to sandwich the first air-conditioning apparatus 180-1 therebetween, and the second front branch duct 130-2 and the first rear branch duct 140-1 are arranged at the other vehicle end 15 to sandwich the second air-conditioning apparatus 180-2 therebetween.

Therefore, in this embodiment, the first front branch duct 130-1, the first chamber duct 120-1, and the first rear branch duct 140-1 are aligned in the vehicle length direction 11 on one side of the air-conditioning apparatuses 180 and the main duct 110 in the vehicle width direction 12, and the second rear branch duct 140-2, the second chamber duct 120-2, and the second front branch duct 130-2 are aligned on the other side thereof.

The front branch ducts 130 and the rear branch ducts 140 arranged on both sides in the vehicle width direction 12 at the vehicle ends 15 do not discharge the conditioned air at the same amount of air from the diffusers 151 into the interior 14. The discharge amount of the front branch ducts 130 from the diffusers 151 into the interior 14 is higher than the discharge amount of the rear branch ducts 140 from the diffusers 151 into the interior 14. This is because, as described above, the front branch ducts 130 are located on the upstream side of the conditioned air flowing in the first chamber 111 and the second chamber 112 of the main duct 110, and have the front guide plates 131 which intake the conditioned air. By this configuration, the lower discharge volume from the rear branch ducts 140 is compensated by the discharge volume from the front branch ducts 130. This compensation can contribute to making the temperature distribution within the interior in the vehicle length direction 11 uniform.

In this case, the ratio of the discharge amount of the front branch ducts 130 and the rear branch ducts 140 will be described in the following air-conditioning operation description.

[Air-conditioning Operation]

The air-conditioning operation of the vehicle air-conditioning duct 100 having the non-uniform distribution configuration configured as mentioned above will be described.

The first air-conditioning apparatus 180-1 and the second air-conditioning apparatus 180-2 on the front and rear sides in the vehicle length direction 11 take in the air in the interior from the suction outlets 181 thereof, regulate the air taken in to a preset temperature and then discharge the air with the preset temperature as the conditioned air through the discharge outlets 115 into the main duct 110. That is, in FIG. 1, by way of example, the first air-conditioning apparatus 180-1 on the left side in the drawing discharges the conditioned air through the discharge outlets 115 into the first chamber 111 of the main duct 110, and the second air-conditioning apparatus 180-2 on the right side in the drawing discharges the conditioned air through the discharge outlets 115 into the second chamber 112 of the main duct 110.

In addition, as already described, in the vehicle length direction 11, the respective chamber ducts 120 are provided corresponding to the main region 117 which is located at the center portion 16 in the vehicle length direction and occupies most part of the main duct 110, and the front branch ducts 130 and the rear branch ducts 140 are provided to communicate with the main duct 110 only in the end regions 116. Therefore the vehicle air-conditioning duct 100 makes the discharge volume of the conditioned air into the interior 14 different and non-uniform among the respective regions of the interior. That is, the vehicle air-conditioning duct 100 can discharge the conditioned air at a higher volume of air to the center portion 16 in the vehicle length direction than to the vehicle ends 15.

Specifically, each of the chamber ducts 120 discharges the conditioned air to the center portion 16 in the vehicle length direction at an airflow volume of 105% to 120% compared to the uniform airflow volume in a state where the conditioned air is uniformly discharged into the interior 14 in the vehicle length direction 11. Further, each of the front branch ducts 130 and each of the rear branch ducts 140 discharge the conditioned air at the remaining discharge airflow volume to each of the vehicle ends 15.

In addition, even when only the vehicle ends 15 are noted, as described above, the discharge airflow volume is different between the right and left sides in the vehicle width direction 12, that is, between the front branch ducts 130 and the rear branch ducts 140. The front branch ducts 130 thus discharge more conditioned air into the interior 14. The total airflow volume of each of the front branch ducts 130 and each of the rear branch ducts 140 at each of the vehicle ends 15 is only necessary to secure 70% to 95% compared to an airflow volume in which the conditioned air is uniformly distributed according to floor area. For instance, when the airflow volume of each of the rear branch ducts 140 is 60% compared to the airflow volume in which the conditioned air is uniformly distributed according to floor area, the airflow volume of each of the front branch ducts 130 is only necessary to secure 80% to 130% compared to the airflow volume in which the conditioned air is uniformly distributed according to floor area.

In the conventional vehicle air-conditioning system, the conditioned air having a velocity in the vehicle length direction 11 is unbalanced at the vehicle ends due to the flow in the duct. However, according to the vehicle air-conditioning duct 100 of this embodiment, the unbalance of the conditioned air to the vehicle ends 15 can be reduced. The temperature distribution in the interior can thus be uniform.

In addition, the discharge airflow volume of the rear branch ducts 140 is lower at the vehicle ends 15, but the insufficient discharge airflow volume can be compensated by the discharge airflow volume of the front branch ducts 130. The supply airflow volume of the conditioned air to the vehicle ends 15 can thus be prevented from being insufficient.

Second Embodiment:
[The Non-uniform Distribution Configuration of a Second Embodiment]

In a second embodiment, the non-uniform distribution configuration is a configuration having plugs which are provided at the respective regions of the interior close to the suction outlets 181 of the air-conditioning apparatuses 180 and block the discharge of the conditioned air into the interior 14. Other configurations are the same as those of the first embodiment, and the descriptions of them are omitted.

As shown in FIGS. 10 to 13, at each of the vehicle ends 15 on which each of the air-conditioning apparatuses 180 is installed, plugs 182 are installed corresponding to each of the suction outlets 181 of each of the air-conditioning apparatuses 180 on the conditioned air discharge outlets 153 of each of the front branch ducts 130 and each of the rear branch ducts 140.

When the conditioned air is discharged from each of the front branch ducts 130 and each of the rear branch ducts 140 near each of the suction outlets 181 of each of the air-conditioning apparatuses 180, the conditioned air may be taken in each of the suction outlets 181 before it is sufficiently mixed with the air in the interior. Thus, the temperature regulation in the interior 14 might not be performed appropriately. To prevent such phenomenon, the plugs 182 are installed on each of the front branch ducts 130 and each of the rear branch ducts 140.

In addition, by the plugs 182, the conditioned air is not discharged from each of the front branch ducts 130 and each of the rear branch ducts 140 at least in sections with each of the suction outlets 181 in the vehicle length direction 11. Thus, the non-uniform distribution in discharging of the conditioned air is achieved.

[The Configuration of the Plugs]

Each of the plugs 182 is e.g., a plate material. Each of the plugs 182 has, in the vehicle length direction 11, a length which is equal to or more than a length "L" of each of the suction outlets 181 of each of the air-conditioning apparatuses 180 and is equal to or less than up to ±30% (160% at the maximum) of length "L" at the front and rear part of the plug. That is, the length of each of the plugs 182 in the vehicle length direction is equal to or more than 100% of the length "L" of each of the suction outlets 181, and is equal to or less than 160% of the length "L".

Figure 10:
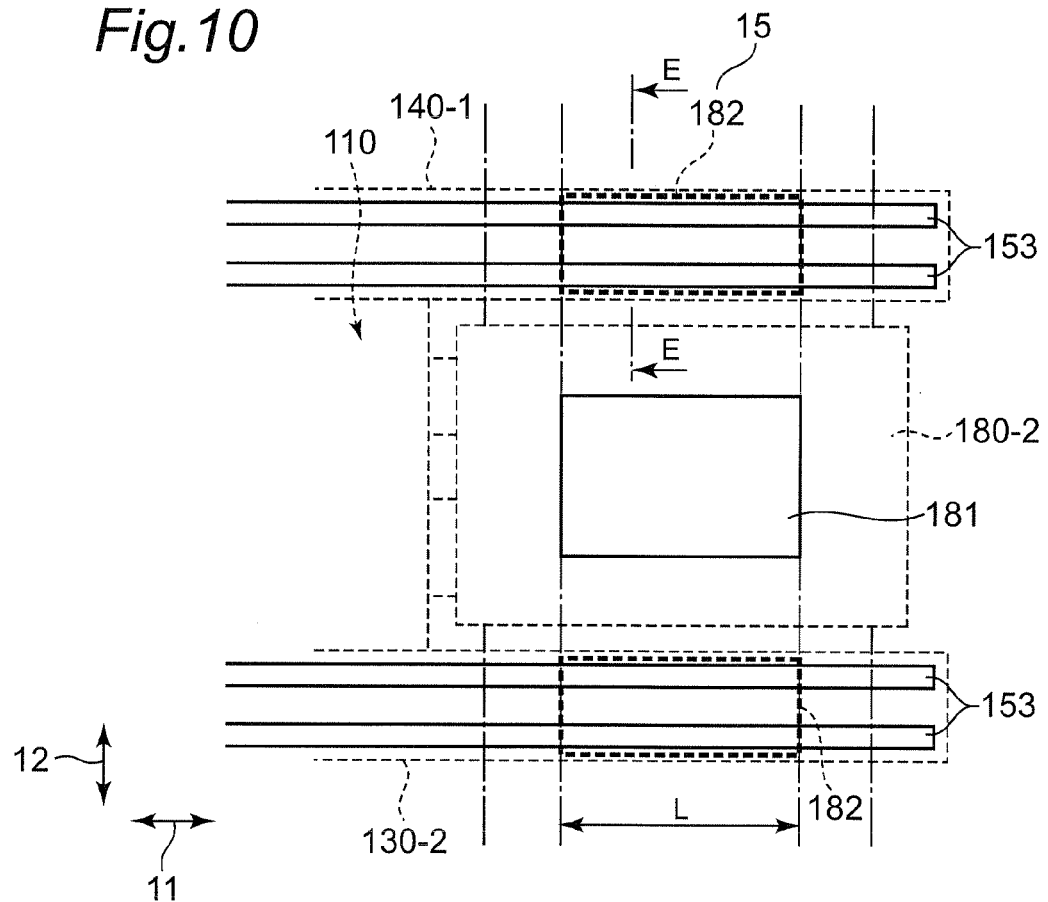
FIG. 10 is a diagram of a ceiling at the vehicle end of the air-conditioning duct in the passenger car shown in FIG. 1 and of assistance in explaining the position relation between plugs and a suction outlet of an air-conditioning apparatus.
Figure 11:
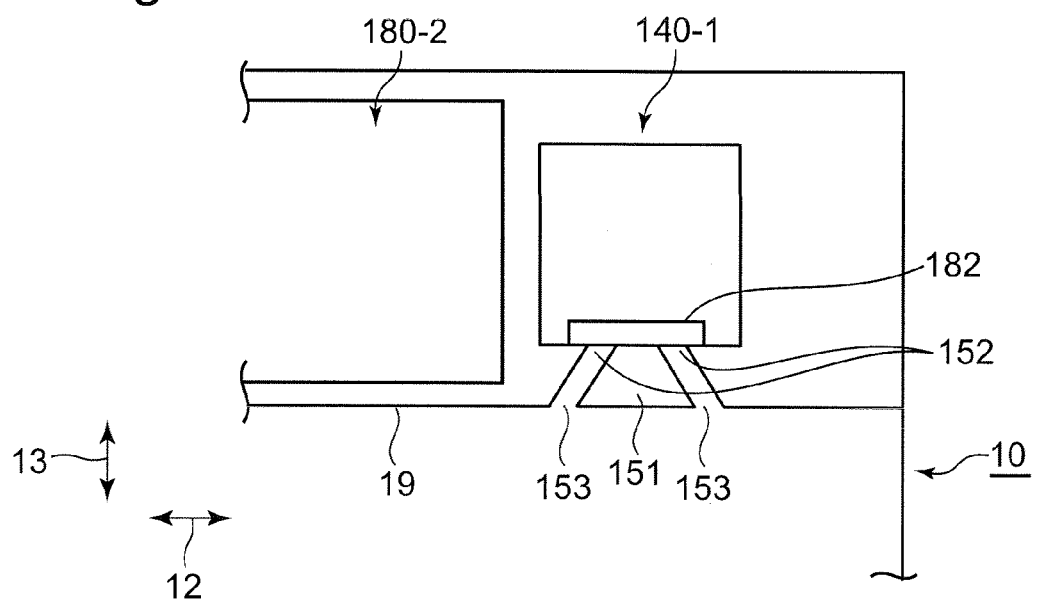
FIG. 11 is a cross-sectional view taken along line E-E shown in FIG. 10.
Figure 12:
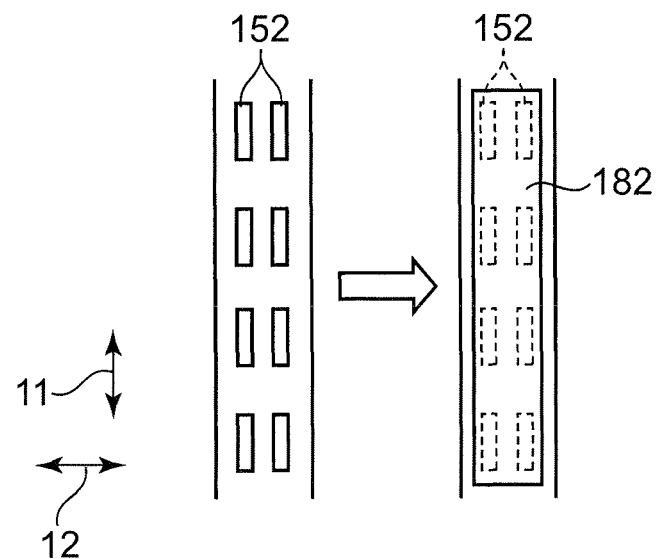
FIG. 12 is a plan view of each of the plugs shown in FIG. 10, showing an example of its arranged state.
Figure 13:
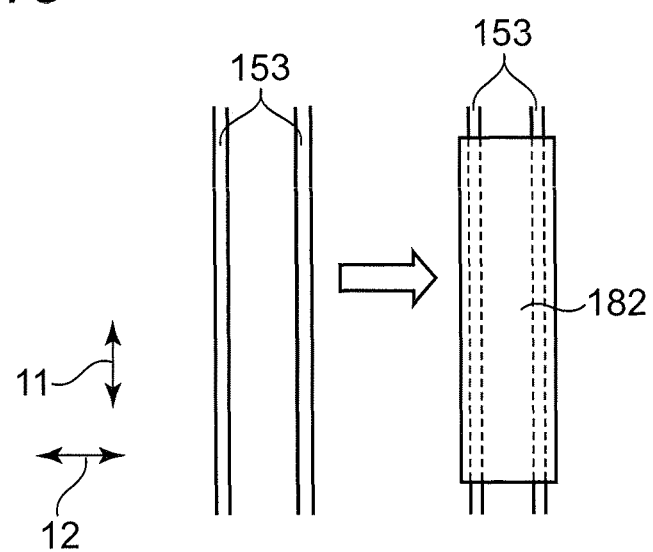
FIG. 13 is a plan view of each of the plugs shown in FIG. 10, showing another example of its arranged state.

In addition, the width of each of the plugs 182 in the vehicle width direction 12 has a size which covers two discharge outlets 153 in the vehicle width direction 12 of each of the front branch ducts 130 and each of the rear branch ducts 140. As shown in FIG. 10, each of the plugs 182 is arranged to always cover the section having the length "L" of each of the suction outlets 181 in the vehicle length direction 11. When each of the plugs 182 has a length which is more than the length "L", it is disposed to extend to at least one of the front and rear sides in the vehicle length direction 11 of each of the suction outlets 181. As shown in FIGS. 11 and 12, each of the plugs 182 is installed inside each of the front branch ducts 130 and each of the rear branch ducts 140, and closes inlet openings 152 which are communicated with the discharge outlets 153 of each of the diffusers 151. Alternatively, as shown in FIG. 13, each of the plugs 182 is provided outside each of the front branch ducts 130 and each of the rear branch ducts 140, and closes the discharge outlets 153.

As described above, each of the plugs 182 is provided on each of the front branch ducts 130 and each of the rear branch ducts 140. Thus, the conditioned air which is discharged from the outlets 153 into the interior 14 can be prevented from directly flowing into each of the suction outlets 181 of each of the air-conditioning apparatuses 180. As a result, the conditioned air and the air in the interior can be effectively mixed with each other, and the temperature distribution in the interior can be uniform.

In this embodiment, as described above, in the conditioned air discharge outlets 153 of both of each of the front branch ducts 130 and each of the rear branch ducts 140, the plugs 182 are installed corresponding to each of the suction outlets 181 of each of the air-conditioning apparatuses 180. However, each of the plugs 182 is not limited to this configuration, and may be installed on at least one of the discharge outlets 153 of each of the front branch ducts 130 and each of the rear branch ducts 140.

Third Embodiment:

[The Non-uniform Distribution Configuration of a Third Embodiment]

Figure 14:
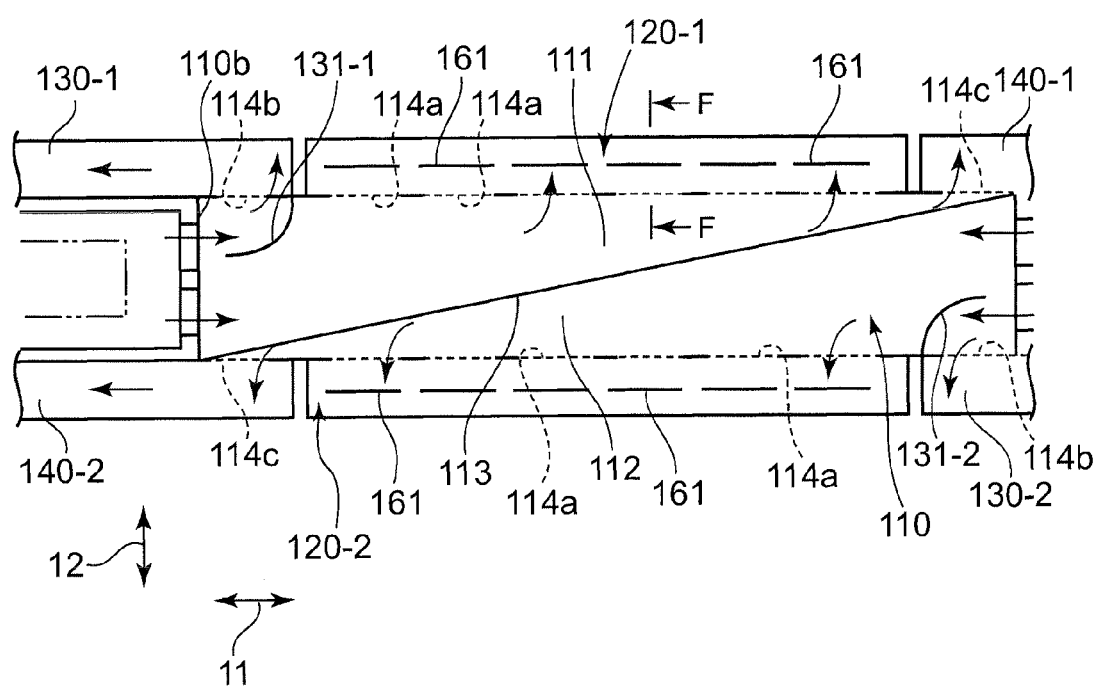
FIG. 14 is a diagram showing the installed state in a vehicle length direction of airflow volume adjusting members in the air-conditioning duct in the passenger car shown in FIG. 1.
Figure 15:
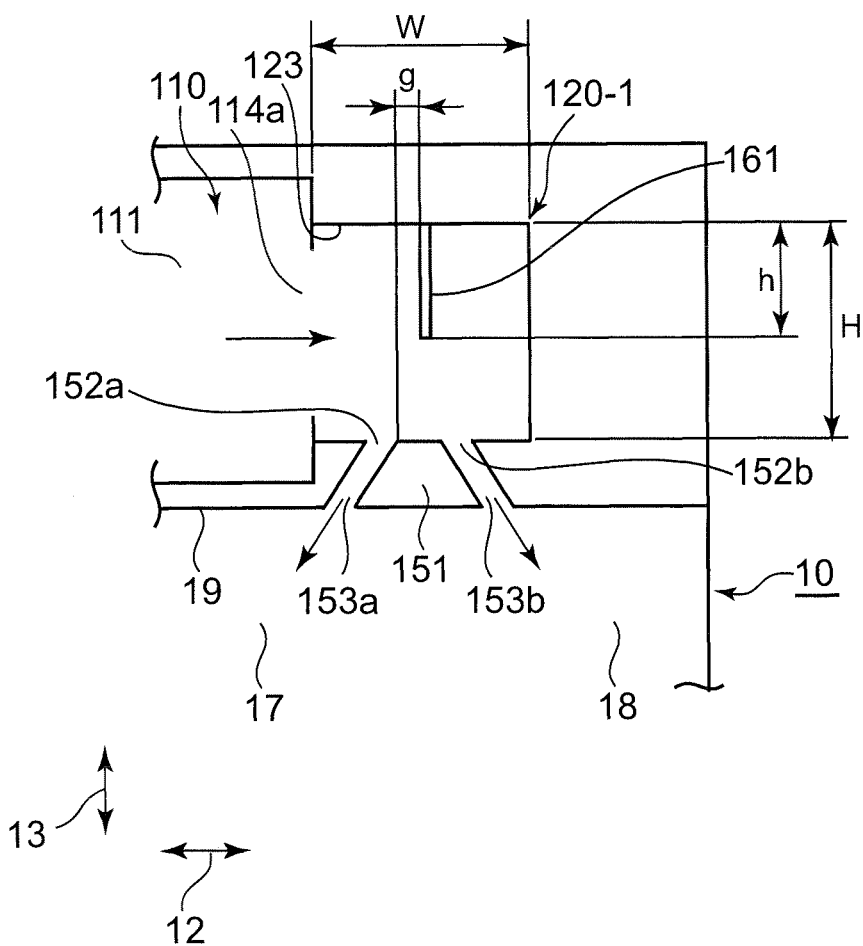
FIG. 15 is a cross-sectional view taken along line F-F shown in FIG. 14.

In a third embodiment, the non-uniform distribution configuration adopts the configuration of the air-conditioning duct 100 according to the first embodiment. Further, as shown in FIGS. 14 and 15, in the non-uniform distribution configuration of the third embodiment, each of the chamber ducts 120 has therein airflow volume adjusting members 161. Other configurations are the same as those of the first embodiment, and the descriptions of them are omitted.

As described above, each of the chamber ducts 120 has the diffuser 151 at the lower portion thereof in the vehicle height direction 13, and each of the diffusers 151 discharges the conditioned air supplied into each of the chamber ducts 120 from the main duct 110 with the conditioned air divided into a vehicle outer side 18 and a vehicle inner side 17 in the vehicle width direction 12. In this configuration, the airflow volume adjusting members 161 are installed in each of the chamber ducts 120, and strike a balance of the discharge volume of the conditioned air between the vehicle outer side 18 and the vehicle inner side 17 at the diffuser 151. That is, the conditioned air flows from the main duct 110 through the outlets 114a into each of the chamber ducts 120, so that the discharge airflow volume of a discharge outlet 153b on the vehicle outer side 18 of the diffuser 151 tends to be higher than that of a discharge outlet 153a on the vehicle inner side 17. Therefore, by providing each of the airflow volume adjusting members 161, the discharge air capacities of the conditioned air on the vehicle outer side 18 and on the vehicle inner side 17 in the diffuser 151 are balanced. In this case, each of the discharge airflow volume of the conditioned air from the discharge outlet 153a on the vehicle inner side 17 and the discharge airflow volume of the conditioned air from the discharge outlet 153b on the vehicle outer side 18 is preferably 50%. However, when the discharge airflow volume is between 45% and 53%, the temperature distribution in the interior is not greatly unbalanced.

[The Configuration of the Airflow Volume Adjusting Plates]

Each of the airflow volume adjusting members 161 is e.g., a plate material. As shown in FIG. 15, in the third embodiment, in the vehicle height direction 13, each of the airflow volume adjusting members 161 is extended downward from an upper surface 123 of each of the chamber ducts 120 to a position corresponding to "h" which is e.g., 50% to 65% of a height "H" of each of the chamber ducts 120. In addition, in the vehicle width direction 12, each of the airflow volume adjusting members 161 is arranged on the downstream side of the conditioned air in each of the chamber ducts 120, that is, on the vehicle outer side 18, so as to be spaced, by a length "g" which is e.g., 20% or less, of a width "W" of each of the chamber ducts 120, from an inlet opening 152a in each of the chamber ducts 120 communicated with the discharge outlet 153a of each of the diffusers 151 on the vehicle inner side 17. Further, in the vehicle length direction 11, each of the airflow volume adjusting members 161 has a length which coincides with or substantially coincides with the length of each of the outlets 114a in each of the chamber ducts 120, and is arranged in a position corresponding to each of the outlets 114a.

By positioning each of the airflow volume adjusting members 161 at the position mentioned above, the conditioned air can be uniformly or substantially uniformly discharged from the discharge outlets 153a and 153b of each of the diffusers 151 in each of the chamber ducts 120 to the vehicle inner side 17 and the vehicle outer side 18. Therefore, the temperature distribution in the interior can be uniform.

Fourth Embodiment:

[The Non-uniform Distribution Configuration of a Fourth Embodiment]

In a fourth embodiment, the non-uniform distribution configuration adopts a modification example of each of the airflow volume adjusting members 161 described in the third embodiment. Other configurations are the same as those of the first embodiment, and the descriptions of them are omitted.

Figure 16:
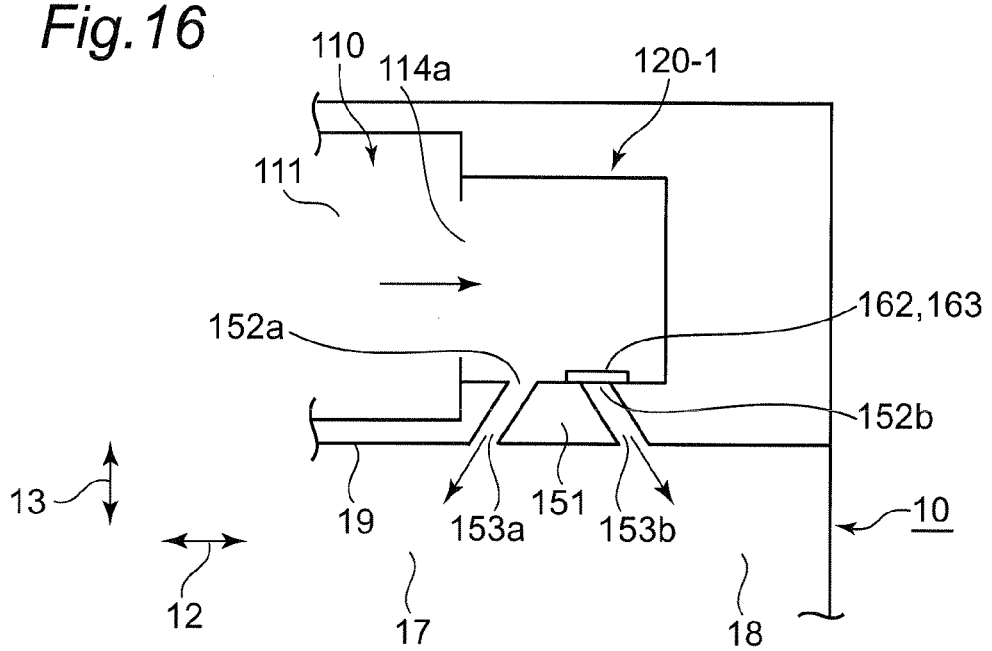
FIG. 16 is a diagram showing a modification example of the airflow volume adjusting members shown in FIG. 14 and is a cross-sectional view taken along line F-F shown in FIG. 14.
Figure 17:
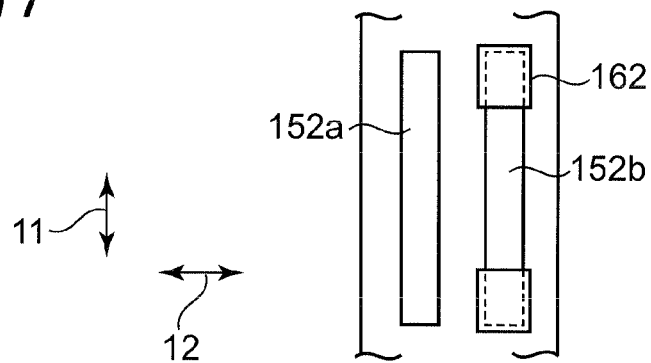
FIG. 17 is a plan view according to an example of each of the airflow volume adjusting members shown in FIG. 16.
Figure 18:
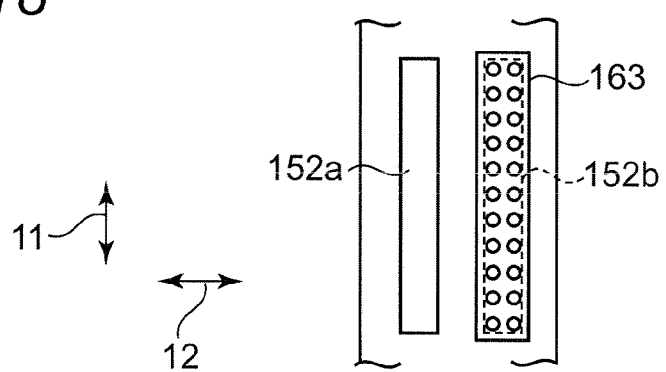
FIG. 18 is a plan view according to another example of each of the airflow volume adjusting members shown in FIG. 16.

As shown in FIGS. 16 to 18, each of closing plates 162 (FIG. 7) or each of porous plates 163 (FIG. 18) as the airflow volume adjusting member 161 is arranged on an inlet opening 152b which is communicated with the discharge outlet 153b on the vehicle outer side 18 of each of the diffusers 151 in each of the chamber ducts 120. Each of the closing plates 162 or each of the porous plates 163 is provided on the inlet opening 152b corresponding to the vehicle outer side 18. As a result, an open ratio of the inlet opening 152b is adjusted to balance the discharge airflow volume of the conditioned air on the vehicle inner side 17 with the discharge airflow volume of the conditioned air on the vehicle outer side 18 in the diffuser 151.

As shown in FIG. 17, each of the closing plates 162 is e.g., a plate material, and closes part of the inlet opening 152b in the vehicle length direction 11. In FIG. 17, the closing plates 162 are provided at both ends of the inlet opening 152b, however the installed position thereof is not limited to this. In addition, in FIGS. 17 and 18, each of the inlet openings 152a and 152b is formed to be continuous in the vehicle length direction 11 in each of the chamber ducts 120. Alternatively, as shown in FIG. 12, a plurality of inlet openings 152a and 152b may be formed at predetermined intervals in the vehicle length direction 11.

The porous plate 163 shown in FIG. 18 shows an example, which does not limit the arrangement and alignment of the hole.

In the above description, the closing plate 162 and the porous plate 163 are arranged on the inlet opening 152b in each of the chamber ducts 120. However, each of the closing plates 162 and each of the porous plates 163 may be arranged outside each of the chamber ducts 120 and on the discharge outlet 153b on the vehicle outer side 18 of the diffuser 151.

By providing each of the closing plates 162 or each of the porous plates 163, the discharge volume of the conditioned air on the vehicle inner side 17 in each of the chamber ducts 120 and the discharge volume of the conditioned air on the vehicle outer side 18 in each of the chamber ducts 120 at each of the diffusers 151 can be adjusted to be balanced. Therefore, the temperature distribution in the interior can be uniform.

Figure 20:
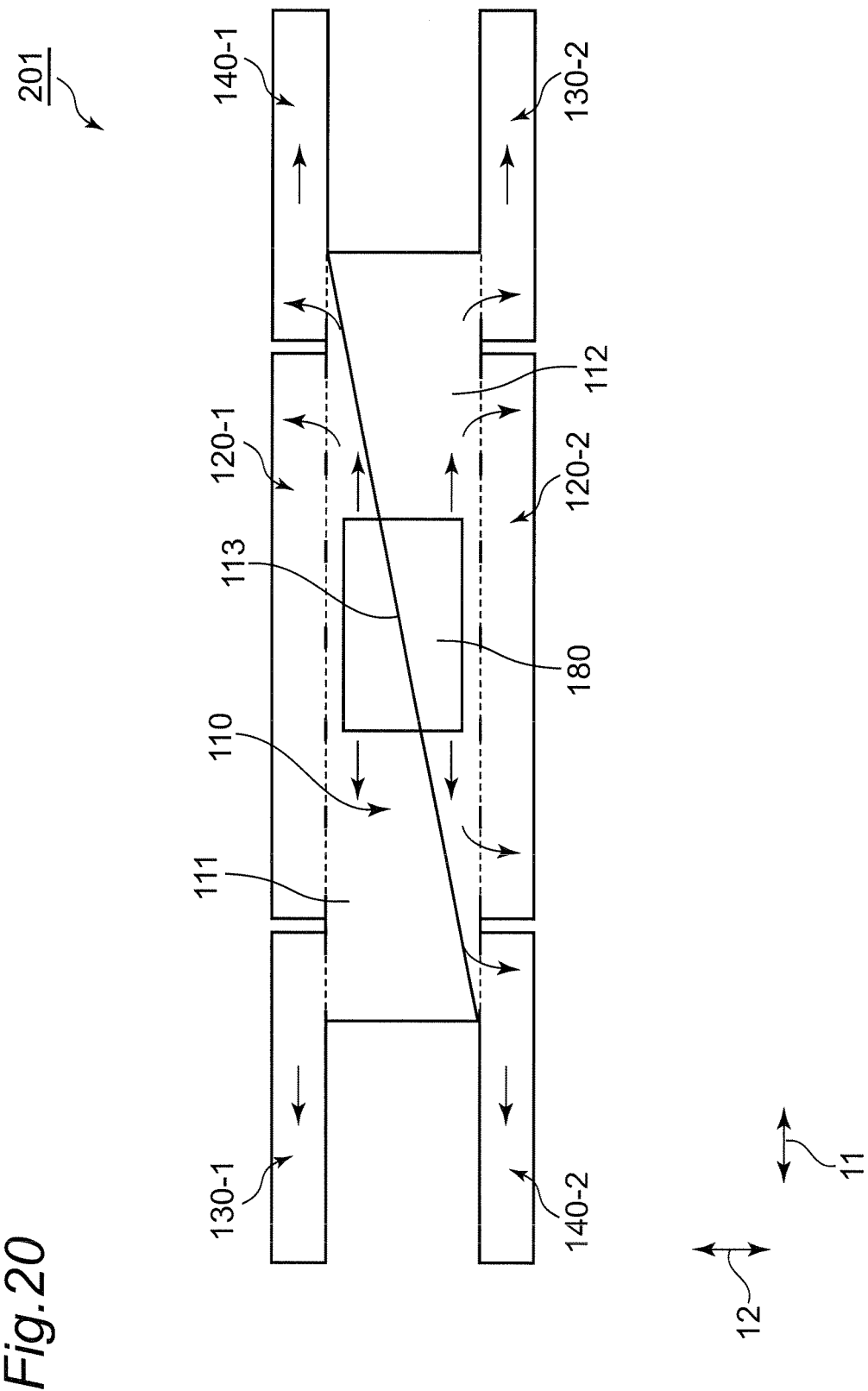
FIG. 20 is a diagram showing a modification example of a vehicle air-conditioning system including the air-conditioning duct in the passenger car shown in FIG. 1.

In the vehicle air-conditioning system 200 having the vehicle air-conditioning duct 100 according to the embodiments, the air-conditioning apparatuses 180 are installed at the vehicle ends 15 in the vehicle length direction 11. However, like a vehicle air-conditioning system 201 shown in FIG. 20, for instance, one air-conditioning apparatus 180 may be arranged at the center portion 16 in the vehicle length direction.

The configurations according to the embodiments can be combined, as needed.

By combining the optional ones of the embodiments as needed, the respective effects in the optional ones can be exerted.

Although this disclosure has been fully described in connection with the preferred embodiments thereof with reference to the accompanying drawings, it is to be noted that various changes and modifications are apparent to those skilled in the art. Such changes and modifications are to be understood as included within the scope of this disclosure as defined by the appended claims unless they depart therefrom.

The entire disclosure of Japanese Patent Application No. 2012-13066 filed on Jan. 25, 2012 including specification, drawings, claims, and summary are incorporated herein by reference in its entirety.

INDUSTRIAL APPLICABILITY

The present invention is applicable to the vehicle air-conditioning duct in a large-sized passenger car, such as a railcar, an aircraft, a ship, and a bus, and the vehicle air-conditioning system including the vehicle air-conditioning duct.

DESCRIPTION OF REFERENCE SYMBOLS

10 . . . Vehicle, 11 . . . Vehicle length direction,
12 . . . Vehicle width direction, 13 . . . Vehicle height direction,
15 . . . Vehicle end,
16 . . . Center portion in the vehicle length direction,
17 . . . Vehicle inner side, 18 . . . Vehicle outer side,
100 . . . Vehicle air-conditioning duct, 110 . . . Main duct,
111 . . . First chamber, 112 . . . Second chamber,
113 . . . Partitioning plate, 115 . . . Discharge outlet,
120 . . . Chamber duct, 130 . . . Front branch duct,
131 . . . Front guide plate, 140 . . . Rear branch duct,
151 . . . Diffuser, 161 . . . Airflow volume adjusting member,
162 . . . Closing plate, 163 . . . Porous plate,
180 . . . Air-conditioning apparatus, 181 . . . Suction outlet,
182 . . . Plug, and
200 . . . Vehicle air-conditioning system.

The invention claimed is:

1. An air-conditioning duct in a passenger car of transportation that extends in a passenger car longitudinal direction at a ceiling portion of the passenger car, the air-conditioning duct comprising:
a main duct positioned in a substantially center portion in a passenger car width direction and configured to receive conditioned air from first and second air-conditioning apparatuses located at opposed longitudinal ends of the passenger car;
a chamber duct, positioned adjacent to the main duct in the passenger car width direction, and configured to receive air from the main duct and discharge the conditioned air into an inside of the passenger car; and
a branch duct configured to discharge the conditioned air into the inside of the passenger car and positioned, in the passenger car longitudinal direction, at at least one of the ends of the passenger car with respect to the chamber duct, wherein:
the main duct has a partitioning plate extending in the passenger car longitudinal direction and connecting diagonal positions at both ends of the main duct in the passenger car longitudinal direction so that the partitioning plate divides the main duct into a first chamber and a second chamber,
the branch duct has, arranged in the passenger car width direction at one of the ends of the passenger car, (i) a first rear branch duct configured to receive the conditioned air from the first air-conditioning apparatus through the first chamber and (ii) a second front branch duct configured to receive the conditioned air from the second air-conditioning apparatus through the second chamber,
a discharge volume of the conditioned air discharged from the second front branch duct into the inside of the passenger car is higher than a discharge volume of the conditioned air discharged from the first rear branch duct into the inside of the passenger car, and
a discharge volume of the conditioned air discharged from the chamber duct into the inside of the passenger car is higher than a discharge volume of the conditioned air discharged from the branch duct into the inside of the passenger car.

2. The air-conditioning duct in a passenger car according to claim 1, wherein the first rear branch duct and the second front branch duct discharge, into the inside of the passenger car at the one end of the passenger car, the conditioned air at 70% to 95% of a uniform airflow volume at which the conditioned air would be uniformly discharged into the inside of the passenger car in the passenger car longitudinal direction.

3. The air-conditioning duct in a passenger car according to claim 1, further comprising a second front guide plate provided in the second chamber and configured to direct a part of the conditioned air discharged from the second air-conditioning apparatus into the second front branch duct, wherein the second front guide plate projects from the second front branch duct into the main duct and covers 35% to 60% of a discharge outlet in the passenger car width direction, the discharge outlet being configured to discharge the conditioned air from the second air-conditioning apparatus into the main duct.

4. The air-conditioning duct in a passenger car according to claim 1, further comprising a second front guide plate provided in the second chamber and configured to direct a part of the conditioned air discharged from the second air-conditioning apparatus into the second front branch duct, wherein the second front guide plate projects from the second front branch duct into the main duct and covers 35% to 60% of a discharge outlet in a passenger car height direction, the discharge outlet being configured to discharge the conditioned air from the second air-conditioning apparatus into the main duct.

5. The air-conditioning duct in a passenger car according to claim 1, wherein:
the chamber duct has (i) a first chamber duct arranged on one of right and left sides of the main duct in the passenger car width direction and configured to receive the conditioned air from the first chamber, and (ii) a second chamber duct arranged on the other of the right and left sides of the main duct in the passenger car width direction and configured to receive the conditioned air from the second chamber, the branch duct has a first front branch duct, both the first front branch duct and the first rear branch duct being configured to receive the conditioned air from the first air-conditioning apparatus through the first chamber, the branch duct has a second rear branch duct, both the second front branch duct and the second rear branch duct being configured to receive the conditioned air from the second air-conditioning apparatus through the second chamber, and a discharge volume of the conditioned air discharged from each of the first and second front branch ducts into the inside of the passenger car is higher than a discharge volume of the conditioned air discharged from each of the first and second rear branch ducts into the inside of the passenger car.

6. The air-conditioning duct in a passenger car according to claim 5, further comprising:
a first front guide plate provided in the first chamber and configured to direct a part of the conditioned air discharged from the first air-conditioning apparatus into the first front branch duct; and
a second front guide plate provided in the second chamber and configured to direct a part of the conditioned air discharged from the second air-conditioning apparatus into the second front branch duct,
wherein each of the first and second front guide plates projects from its respective front branch duct into the main duct and covers 35% to 60% of a respective discharge outlet in the passenger car width direction, each of the respective discharge outlets being configured to discharge the conditioned air from one of the air-conditioning apparatuses into the main duct.

7. The air-conditioning duct in a passenger car according to claim 5, further comprising:
a first front guide plate provided in the first chamber and configured to direct a part of the conditioned air discharged from the first air-conditioning apparatus into the first front branch duct; and
a second front guide plate provided in the second chamber and configured to direct a part of the conditioned air discharged from the second air-conditioning apparatus into the second front branch duct,
wherein each of the first and second front guide plates projects from its respective front branch duct into the main duct and covers 35% to 60% of a respective discharge outlet in a passenger car height direction, each of the respective discharge outlets being configured to discharge the conditioned air from one of the air-conditioning apparatuses into the main duct.

8. The air-conditioning duct in a passenger car according to claim 1, further comprising a plug (i) provided in a position corresponding to a suction outlet which is included in a said air-conditioning apparatus and is configured to take in the air in the inside of the passenger car, and (ii) configured to block the discharge of the conditioned air into the inside of the passenger car,
wherein a length in the passenger car longitudinal direction of the plug is equal to or more than a length in the passenger car longitudinal direction of the suction outlet.

9. The air-conditioning duct in a passenger car according to claim 8, wherein:
the chamber duct has (i) a first chamber duct arranged on one of right and left sides of the main duct in the passenger car width direction and configured to receive the conditioned air from the first chamber, and (ii) a second chamber duct arranged on the other of the right and left sides of the main duct in the passenger car width direction and configured to receive the conditioned air from the second chamber,
the branch duct has a first front branch duct, both the first front branch duct and the first rear branch duct being configured to receive the conditioned air from the first air-conditioning apparatus through the first chamber,
the branch duct has a second rear branch duct, both the second front branch duct and the second rear branch duct being configured to receive the conditioned air from the second air-conditioning apparatus through the second chamber, and
the plug is provided on at least one discharge outlet of each of the first and second front branch ducts and each of the first and second rear branch ducts.

10. The air-conditioning duct in a passenger car according to 8, wherein the length of the plug is equal to or more than 100% of the length of the suction outlet in the passenger car longitudinal direction and is equal to or less than 160% of the length of the suction outlet in the passenger car longitudinal direction.

11. The air-conditioning duct in a passenger car according to claim 9, wherein the plug extends to at least one of front and rear sides of the suction outlet in the passenger car longitudinal direction.

12. The air-conditioning duct in a passenger car according to claim 1, wherein the chamber duct further includes:
a diffuser having an inner side discharge outlet and an outer side discharge outlet arranged in the passenger car width direction, the diffuser being configured to guide the conditioned air from the chamber duct into the inside of the passenger car through the inner side discharge outlet and the outer side discharge outlet; and
an airflow volume adjusting member provided in the chamber duct and configured to balance a discharge volume of the conditioned air from the outer side discharge outlet into the inside of the passenger car with a discharge volume of the conditioned air from the inner side discharge outlet into the inside of the passenger car.

13. The air-conditioning duct in a passenger car according to claim 12, wherein a percentage of the discharge volume of the conditioned air from the outer side discharge outlet into the inside of the passenger car and the discharge volume of the conditioned air from the inner side discharge outlet into the inside of the passenger car is between 45% and 55%.

14. The air-conditioning duct in a passenger car according to claim 12, wherein the airflow volume adjusting member is a plate which extends from an upper surface of the chamber duct to a position which is 50% to 65% of the height of the chamber duct in a passenger car height direction.

15. The air-conditioning duct in a passenger car according to claim 12, wherein the airflow volume adjusting member is installed downstream of the conditioned air in the chamber duct at a position which is 20% or less of the width of the chamber duct from an inlet opening in the chamber duct communicated with the inner side discharge outlet in the passenger car width direction.

16. The air-conditioning duct in a passenger car according to claim 12, wherein the airflow volume adjusting member is provided at an inlet opening communicated with the outer side discharge outlet of the diffuser in the chamber duct.

17. The air-conditioning duct in a passenger car according to claim 16, wherein the airflow volume adjusting member is a porous plate or a closing plate.

18. A railcar comprising:
an air-conditioning duct in a passenger car according to claim 1; and
an air-conditioning apparatus arranged on a roof of the railcar and configured to supply conditioned air into the air-conditioning duct.

19. A railcar comprising:
an air-conditioning duct in a passenger car according to claim 5;
wherein the first air-conditioning apparatus is provided between a first front branch duct and a second rear branch duct in the railcar width direction,
the second air-conditioning apparatus is provided between the first rear branch duct and the second front branch duct in the railcar width direction, and
the main duct is provided between the first air-conditioning apparatus and the second air-conditioning apparatus in the railcar longitudinal direction.

20. The air-conditioning duct in a passenger car according to claim 1,
wherein the main duct, the chamber duct, and the branch duct are intersected by a single plane.

21. The air-conditioning duct in a passenger car according to claim 1, wherein:
the first rear branch duct receives the conditioned air from the first air-conditioning apparatus by way of a rear outlet formed in a side surface of the main duct that faces the passenger car width direction; and
the second front branch duct receives the conditioned air from the second air-conditioning apparatus by way of a front outlet formed in another side surface of the main duct that faces the passenger car width direction.

22. The air-conditioning duct in a passenger car according to claim 1, wherein:
the first air-conditioning apparatus supplies conditioned air only to a first side of the branch duct in the passenger car width direction; and
the second air-conditioning apparatus supplies conditioned air only to a second side of the branch duct that is opposite the first side in the passenger car width direction.

23. The air-conditioning duct in a passenger car according to claim 1,
wherein in the passenger car longitudinal direction, the partitioning plate extends past an outlet in a side surface of the main duct by which the first rear branch duct receives the conditioned air from the first air-conditioning apparatus.

24. The air-conditioning duct in a passenger car according to claim 1, wherein the branch duct extends from the main duct and toward the longitudinal end of the car so that the second air-conditioning apparatus is between the first rear branch duct and the second front branch duct.

25. The air-conditioning duct in a passenger car according to claim 1, wherein:
the first rear branch duct receives the conditioned air from the first air-conditioning apparatus by way of a rear outlet formed in a side surface of the main duct that faces the passenger car width direction;
the second front branch duct receives the conditioned air from the second air-conditioning apparatus by way of a front outlet formed in another side surface of the main duct that faces the passenger car width direction;
the first air-conditioning apparatus supplies conditioned air only to a first side of the branch duct in the passenger car width direction;
the second air-conditioning apparatus supplies conditioned air only to a second side of the branch duct that is opposite the first side in the passenger car width direction; and
in the passenger car longitudinal direction, the partitioning plate extends past the rear outlet in the side surface of the main duct by which the first rear branch duct receives the conditioned air from the first air-conditioning apparatus.

\* \* \* \* \*